United States Patent [19]
Colt et al.

[11] Patent Number: 5,853,469
[45] Date of Patent: Dec. 29, 1998

[54] INK COMPOSITIONS FOR INK JET PRINTING

[75] Inventors: Richard L. Colt, Rochester; Kurt B. Gundlach, Fairport, both of N.Y.

[73] Assignee: Xerox Corporation, Stamford, Conn.

[21] Appl. No.: 903,699

[22] Filed: Jul. 31, 1997

[51] Int. Cl.$^6$ ................................................ C09D 11/02
[52] U.S. Cl. .................................... 106/31.49; 106/31.58; 106/31.78; 106/31.86
[58] Field of Search ............................ 106/31.49, 31.58, 106/31.78, 31.86

[56] References Cited

U.S. PATENT DOCUMENTS

| | | | |
|---|---|---|---|
| 4,407,882 | 10/1983 | Hauser et al. | 106/31.78 |
| 4,411,700 | 10/1983 | Sekikawa et al. | 106/31.78 |
| 5,220,346 | 6/1993 | Carreira et al. | 346/1.1 |
| 5,563,644 | 10/1996 | Isganitis et al. | 347/102 |
| 5,722,743 | 6/1998 | Gundlach et al. | 106/31.78 |
| 5,772,744 | 6/1998 | Gundlach et al. | 106/31.78 |
| 5,788,750 | 8/1998 | Gundlach et al. | 106/31.78 |

*Primary Examiner*—Helene Klemanski
*Attorney, Agent, or Firm*—Judith L. Byorick

[57] ABSTRACT

Disclosed is an ink composition which comprises water, a colorant, and an additive selected from imidazolium formate, imidazolium phosphite, and mixtures thereof. Another embodiment of the invention includes a process which entails incorporating an ink composition of the present invention into an ink jet printing apparatus and causing droplets of the ink composition to be ejected in an imagewise pattern onto a substrate. In one preferred embodiment, the printing apparatus employs a thermal ink jet process wherein the ink in the nozzles is selectively heated in an imagewise pattern, thereby causing droplets of the ink to be ejected in imagewise pattern. In another preferred embodiment, the ink is used in a printing process which employs microwave drying of the printed image.

11 Claims, No Drawings

— 5,853,469 —

INK COMPOSITIONS FOR INK JET PRINTING

BACKGROUND OF THE INVENTION

The present invention is directed to ink compositions. More specifically, the present invention is directed to compositions suitable for use in ink jet printing processes. One embodiment of the present invention is directed to an ink composition which comprises water, a colorant, and an additive selected from imidazolium formate, imidazolium phosphite, and mixtures thereof.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

While known compositions and processes are suitable for their intended purposes, a need remains for improved ink compositions. In addition, a need remains for improved ink compositions particularly suitable for ink jet printing processes. Further, a need remains for improved ink compositions particularly suitable for use in printing processes employing microwave drying. Additionally, a need remains for ink compositions suitable for ink jet printing processes employing microwave drying wherein the inks exhibit reduced corrosive activity in the printing hardware. There is also a need for ink compositions suitable for ink jet printing processes employing microwave drying wherein the ink exhibits antibacterial characteristics without the need for an added biocide. In addition, there is a need for ink compositions suitable for ink jet printing processes employing microwave drying wherein the ink has excellent buffering characteristics. Further, there is a need for ink compositions suitable for ink jet printing processes employing microwave drying wherein the inks exhibit relatively low viscosities. Additionally, there is a need for ink compositions suitable for ink jet printing processes employing microwave drying wherein the inks exhibit improved substrate penetration characteristics. A need also remains for ink compositions suitable for ink jet printing processes employing microwave drying wherein the inks exhibit relatively high surface tension and good front face repellency in the printhead. In addition, a need remains for ink compositions suitable for ink jet printing processes employing microwave drying wherein plain papers printed with the ink exhibit reduced curling. Further a need remains for ink compositions suitable for ink jet printing processes employing microwave drying wherein the inks generate high quality images on transparency substrates. Additionally, a need remains for ink compositions suitable for ink jet printing processes employing microwave drying wherein the inks exhibit good recoverability and latency characteristics. There is also a need for ink compositions suitable for ink jet printing processes employing microwave drying wherein the ink exhibits improved transparency latitude, including robust performance with respect to low intercolor bleed and good light transmission on a variety of commercially available thermal ink jet transparency stock. In addition, there is a need for ink compositions suitable for ink jet printing processes employing microwave drying wherein the inks exhibit good conductivity characteristics and microwave coupling characteristics. Further, there is a need for ink compositions suitable for ink jet printing processes employing microwave drying wherein the inks exhibit acceptable drying times. Additionally, there is a need for ink compositions suitable for ink jet printing processes employing microwave drying wherein a wide range of direct, acid, and reactive dyes can be selected as the ink colorant. A need also remains for ink compositions suitable for ink jet printing processes employing microwave drying wherein the ink exhibits improved filterability through 0.2 micron filters and reduced large particulates. Further, a need remains for ink compositions suitable for ink jet printing processes employing microwave drying which can be manufactured easily.

SUMMARY OF THE INVENTION

It is an object of the present invention to provide ink compositions with the above noted advantages.

It is another object of the present invention to provide improved ink compositions.

It is yet another object of the present invention to provide improved ink compositions particularly suitable for ink jet printing processes.

It is still another object of the present invention to provide improved ink compositions particularly suitable for use in printing processes employing microwave drying.

Another object of the present invention is to provide ink compositions suitable for ink jet printing processes employing microwave drying wherein the inks exhibit reduced corrosive activity in the printing hardware.

Yet another object of the present invention is to provide ink compositions suitable for ink jet printing processes employing microwave drying wherein the ink exhibits antibacterial characteristics without the need for an added biocide.

Still another object of the present invention is to provide ink compositions suitable for ink jet printing processes employing microwave drying wherein the ink has excellent buffering characteristics.

It is another object of the present invention to provide ink compositions suitable for ink jet printing processes employing microwave drying wherein the inks exhibit relatively low viscosities.

It is yet another object of the present invention to provide ink compositions suitable for ink jet printing processes employing microwave drying wherein the inks exhibit improved substrate penetration characteristics.

It is still another object of the present invention to provide ink compositions suitable for ink jet printing processes employing microwave drying wherein the inks exhibit relatively high surface tension and good front face repellency in the printhead.

Another object of the present invention is to provide ink compositions suitable for ink jet printing processes employing microwave drying wherein plain papers printed with the ink exhibit reduced curling.

Yet another object of the present invention is to provide ink compositions suitable for ink jet printing processes employing microwave drying wherein the inks generate high quality images on transparency substrates.

Still another object of the present invention is to provide ink compositions suitable for ink jet printing processes employing microwave drying wherein the inks exhibit good recoverability and latency characteristics.

It is another object of the present invention to provide ink compositions suitable for ink jet printing processes employing microwave drying wherein the ink exhibits improved transparency latitude, including robust performance with respect to low intercolor bleed and good light transmission on a variety of commercially available thermal ink jet transparency stock.

It is yet another object of the present invention to provide ink compositions suitable for ink jet printing processes employing microwave drying wherein the inks exhibit good conductivity characteristics and microwave coupling characteristics.

It is still another object of the present invention to provide ink compositions suitable for ink jet printing processes employing microwave drying wherein the inks exhibit acceptable drying times.

Another object of the present invention is to provide ink compositions suitable for ink jet printing processes employing microwave drying wherein a wide range of direct, acid, and reactive dyes can be selected as the ink colorant.

Yet another object of the present invention is to provide ink compositions suitable for ink jet printing processes employing microwave drying wherein the ink exhibits improved filterability through 0.2 micron filters and reduced large particulates.

Still another object of the present invention is to provide ink compositions suitable for ink jet printing processes employing microwave drying which can be manufactured easily.

These and other objects of the present invention (or specific embodiments thereof) can be achieved by providing an ink composition which comprises water, a colorant, and an additive selected from imidazolium formate, imidazolium phosphite, and mixtures thereof.

DETAILED DESCRIPTION OF THE INVENTION

Inks of the present invention contain an aqueous liquid vehicle, a colorant, and an imidazolium formate or phosphite salt. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, tripropylene glycol monomethyl ether, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant which has a boiling point higher than that of water (100° C.). In the ink compositions of the present invention, the liquid vehicle is typically present in an amount from about 80 to about 99.9 percent by weight of the ink, and preferably from about 90 to about 99 percent by weight of the ink, although the amount can be outside these ranges.

Also contained in the ink composition of the present invention is a colorant. Any suitable colorant can be employed, including dyes, pigments, mixtures thereof, and the like.

Any suitable dye or mixture of dyes compatible with the ink liquid vehicle can be used, including acid dyes, basic dyes, direct dyes, reactive dyes, and the like, with water soluble anionic dyes and cationic dyes being preferred. Examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109,118,119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza[18]annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, NY; Pontamine Brilliant Bond Blue; Berncolor A.Y. 34; Telon Fast Yellow 4GL-1 75; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Hoechst, such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof. The dye is present in the ink composition in any effective amount, typically from about 0.5 to about 15 percent by weight, and preferably from about 1 to about 10 percent by weight, although the amount can be outside of these ranges.

Examples of suitable pigments for the inks of the present invention include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as Cl 60710, Cl Dispersed Red 15, a diazo dye identified in the Color Index as Cl 26050, Cl Solvent Red 19, and the like. Illustrative examples of suitable cyan pigments include copper tetra-4-(octadecyl sulfonamido) phthalocyanine, X-copper phthalocyanine pigment, listed in the Color Index as Cl 74160, Cl Pigment Blue, and Anthradanthrene Blue, identified in the Color Index as Cl 69810, Special Blue X-2137, and the like. Illustrative examples of yellow pigments that can be selected include diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), available from Hoechst Celanese Corporation, Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Hellogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange 6 (Aldrich), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow F6 1 (Hoechst), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company)), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), CAB-O-JET 200 hydrophilic carbon black (Cabot Corp.), CAB-O-JET 300 hydrophilic carbon black (Cabot Corp.), and the like. Additional suitable commercially available pigment dispersions include the Hostafines available from Hoechst, including Hostafine Yellow HR and Hostafine Blue B2G, as well as dispersions available from BASF, including Disperse Black 00-6607, Luconyl Yellow 1250, Basoflex Pink 4810, Luconyl Blue 7050, and the like. Additional examples of suitable hydrophilic pigment particles include the colored silica particles prepared as disclosed in, for example, U.S. Pat. No. 4,877,451 and U.S. Pat. No. 5,378,574, the disclosures of each of which are totally incorporated herein by reference. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 micron, although the particle size can be outside these ranges. Within the ink compositions of the present invention, the pigment is present in any effective amount to achieve the desired degree of coloration. Typically, the pigment is present in the ink in an amount from about 0.1 to about 8 percent by weight, and preferably from about 2 to about 7 percent by weight, although the amount can be outside these ranges.

The inks of the present invention further contain an additive selected from imidazolium formate, imidazolium phosphite, and mixtures thereof. While not being limited to any particular theory, imidazolium formate is believed to be of the formula

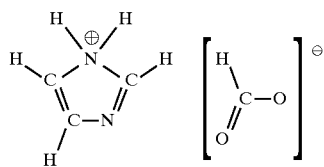

and imidazolium phosphite is believed to be of the formula

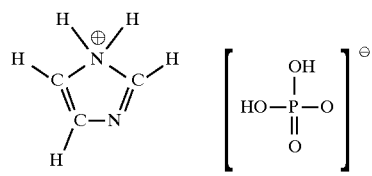

The species

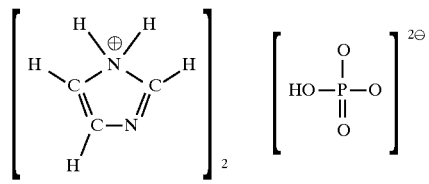

is also encompassed within the imidazolium phosphite of the present invention, although this species is likely to be present in relatively low amounts in inks with the most preferred pH values. The imidazolium ion can also be substituted if desired; examples of suitable substituted imidazolium ions include 1-methyl imidazolium, 1-butyl imidazolium, and the like. Imidazolium formate is particularly preferred for inks with superior transparency latitude, recoverability, surface tension, conductivity, and viscosity. The imidazolium formate or phosphate additive typically is present in the ink in an amount from about 1 to about 30 percent by weight of the ink, and preferably from about 3 to about 25 percent by weight of the ink, although the amount can be outside of these ranges.

Other additives can also be present in the inks. For example, one or more surfactants or wetting agents can be added to the ink. These additives may be of the cationic, anionic, or nonionic types. Suitable surfactants and wetting agents include sodium lauryl sulfate, Tamol® SN, Tamol® LG, those of the Triton® series available from Rohm and Haas Company, those of the Marasperse® series, those of the Igepal® series available from GAF Company, those of the Tergitol® series, and other commercially available surfactants. These surfactants and wetting agents are present in effective amounts, generally from 0 to about 15 percent by weight, and preferably from about 0.01 to about 8 percent by weight, although the amount can be outside of this range.

Polymeric additives can also be added to the inks to enhance the viscosity and the stability of the ink. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethylene oxide, block copolymers of polyethylene oxide and polypropylene oxide, polyvinylpyridine, polyethyleneimine, polyhydroxyethyl ethyleneimine, polyquaternary salts, and the like are typical polymeric additives. Polymeric additives can be present in the ink of the present invention in amounts of from 0 to about 10 percent by weight, and preferably from about 0.01 to about 5 percent by weight, although the amount can be outside this range.

One example of an additive to the inks is a polymeric additive consisting of two polyalkylene oxide chains bound to a central bisphenol-A-type moiety. This additive is of the formula

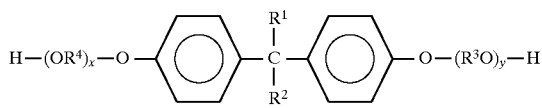

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers,* N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.,* C25(3), 325–373 (1985), the disclosures of each of which are totally incorporated herein by reference. The polyalkylene oxide additive is generally present in the ink in an amount of at least about 1 part per million. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

Other optional additives to the inks include biocides such as Dowicil 150, 200, and 75, benzoate salts, sorbate salts, and the like, present in an amount from about 0.0001 to about 4 percent by weight, and preferably from about 0.01 to about 2.0 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

The ink compositions are generally of a viscosity suitable for use in thermal ink jet printing processes. At room temperature (i.e., about 25° C.), typically, the ink viscosity is no more than about 5 centipoise, with the viscosity usually being from about 1.5 to about 4 centipoise and preferably being from about 1 to about 2.5 centipoise, although the viscosity can be outside these ranges.

Ink compositions of the present invention can be of any suitable or desired pH. For some embodiments, such as thermal ink jet printing processes, typical pH values are from about 5 to about 10, preferably from about 6 to about 10, and more preferably from about 7 to about 8, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by preparing a conventional ink composition according to any desired process, such as by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering. In addition, for the inks of the present invention, the imidazolium formate or imidazolium phosphite additive can be generated during the ink preparation process by including imidazole in the ink ingredients and subsequently adding formic acid or phosphorous acid to the ink until the desired pH value is achieved.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

In another preferred embodiment of the present invention, the ink is used in a printing process which employs microwave drying of the printed image. Printing processes and apparatus employing microwave drying, including ink jet printing processes, are disclosed in, for example, U.S. Pat. No. 5,563,644 (Isganitis et al.) and U.S. Pat. No. 5,220,346 (Carreira et al.), the disclosures of each of which are totally incorporated herein by reference. The ink is applied to a suitable substrate in imagewise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like. One embodiment of the present invention is directed to a printing process which comprises applying in imagewise fashion to a substrate an ink composition which comprises water, a colorant, and an additive selected from imidazolium formate, imidazolium phosphite, and mixtures thereof, and subsequently exposing the substrate to microwave radiation, thereby drying the images on the substrate. Another embodiment of the present invention is directed to a thermal ink jet printing process which comprises (1) incorporating into a thermal ink jet printing apparatus an ink composition which comprises water, a colorant, and an additive selected from imidazolium formate, imidazolium phosphite, and mixtures thereof; (2) heating the ink in an imagewise pattern to cause bubbles to form therein, thereby causing droplets of the ink to be ejected in an imagewise pattern onto a substrate, thereby generating images on the substrate; and (3) exposing the substrate to microwave radiation, thereby drying the images on the substrate.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Ink compositions were prepared by admixing the following ingredients followed by roll milling for 30 minutes and filtering the resulting inks through a 0.2 micron nylon filter:

Yellow Ink deionized water, 410.28 grams;

ethylene diamine tetraacetic acid (Dow Chemical Co.), 1 gram;

polyethylene oxide (bisphenol-A derivative), of the formula

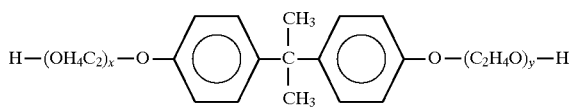

molecular weight 18,500 (Polysciences Corp.), 0.5079 gram;

DOWICIL 150 biocide (Dow Chemical Co.), 0.999 gram;
dipropylene glycol (Ashland Chemicals), 79.96 grams;
tripropylene glycol methyl ether (Dow Chemical Co.), 89.99 grams;
PROJET YELLOW 1G yellow dye solution (Zeneca Colors), 167.76 grams;
Acid Yellow 17 yellow dye solution (Tricon Colors), 175.02 grams;
imidazolium phosphite, 75.01 grams (imidazole (Aldrich Chemical Co., 50 grams) and phosphorous acid (Rhone Poulenc, 25.01 grams))

Magenta Ink deionized water, 460.41 grams;

ethylene diamine tetraacetic acid (Dow Chemical Co.), 0.9994 gram;

polyethylene oxide (bisphenol-A derivative), of the formula

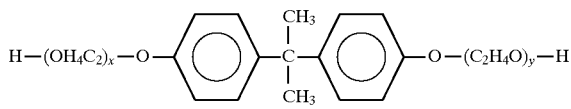

molecular weight 18,500 (Polysciences Corp.), 0.5 gram;
DOWICIL 150 biocide (Dow Chemical Co.), 1.027 gram;
dipropylene glycol (Ashland Chemicals), 80.01 grams;
tripropylene glycol methyl ether (Dow Chemical Co.), 90.01 grams;
PROJET MAGENTA 1T magenta dye solution (Zeneca Colors), 250.05 grams;
Acid Red 52 red dye solution (Tricon Colors), 42.54 grams;
imidazolium phosphite, 75.02 grams (imidazole (Aldrich Chemical Co., 50 grams) and phosphorous acid (Rhone Poulenc, 25.02 grams))

Cyan Ink deionized water, 402.99 grams;
ethylene diamine tetraacetic acid (Dow Chemical Co.), 1.0002 gram;

polyethylene oxide (bisphenol-A derivative), of the formula

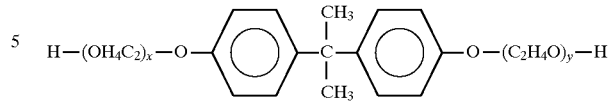

molecular weight 18,500 (Polysciences Corp.), 0.501 gram;
DOWICIL 150 biocide (Dow Chemical Co.), 0.9995 gram;
dipropylene glycol (Ashland Chemicals), 80 grams;
tripropylene glycol methyl ether (Dow Chemical Co.), 90 grams;
PROJET CYAN 1 cyan dye solution (Zeneca Colors), 350.04 grams;
imidazolium phosphite, 75.02 grams (imidazole (Aldrich Chemical Co., 50 grams) and phosphorous acid (Rhone Poulenc, 25.02 grams))

The ink compositions exhibited the following values for viscosity (centipoise, measured at 25° C., Brookfield Model DV-II), surface tension (dynes per centimeter, Kruss model K10T), pH (Corning model 345), and conductivity (mmhos, YSI Model 32/3417).

| Ink | Viscosity | Surface Tension | pH | Conductivity |
| --- | --- | --- | --- | --- |
| Yellow | 2.49 | 42.6 | 7.26 (21.7° C.) | 10.86 |
| Magenta | 2.61 | 41.9 | 7.27 (23.0° C.) | 11.56 |
| Cyan | 2.50 | 40.5 | 7.29 (21.9° C.) | 10.05 |

The inks were incorporated into a Hewlett-Packard 550C thermal ink jet printer and prints were generated onto a variety of plain office papers, thermal ink jet papers, and thermal ink jet transparencies. Good quality prints were obtained and the ink exhibited good recoverability in the printer. It is believed that these inks will exhibit excellent drying characteristics when subjected to microwave drying.

EXAMPLE II

Ink compositions were prepared by admixing the following ingredients followed by roll milling for 30 minutes and filtering the resulting inks through a 0.2 micron nylon filter:

Yellow Ink deionized water, 296.12 grams;
ethylene diamine tetraacetic acid (Dow Chemical Co.), 1.0013 gram;
polyethylene oxide (bisphenol-A derivative), of the formula

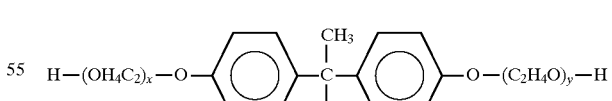

molecular weight 18,500 (Polysciences Corp.), 0.5013 gram;
DOWICIL 150 biocide (Dow Chemical Co.), 1.0004 gram;
dipropylene glycol (Ashland Chemicals), 80 grams;
tripropylene glycol methyl ether (Dow Chemical Co.), 90.02 grams;
PROJET YELLOW 1G yellow dye solution (Zeneca Colors), 269.99 grams;

Acid Yellow 17 yellow dye solution (Tricon Colors), 201.75 grams;

imidazolium formate, 59.99 grams (imidazole (Aldrich Chemical Co., 49.99 grams) and formic acid (Aldrich Chemical Co., 10 grams))

Magenta Ink deionized water, 475.68 grams ethylene diamine tetraacetic acid (Dow Chemical Co.), 1.0019 gram;

polyethylene oxide (bisphenol-A derivative), of the formula

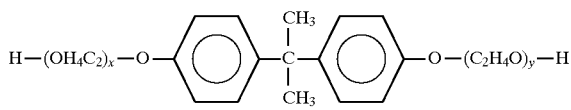

molecular weight 18,500 (Polysciences Corp.), 0.5001 gram;

DOWICIL 150 biocide (Dow Chemical Co.), 1.0011 gram;

dipropylene glycol (Ashland Chemicals), 79.96 grams;

tripropylene glycol methyl ether (Dow Chemical Co.), 90.03999 grams;

PROJET MAGENTA 1T magenta dye solution (Zeneca Colors), 250 grams;

Acid Red 52 red dye solution (Tricon Colors), 42.5 grams;

imidazolium formate, 59.99 grams (imidazole (Aldrich Chemical Co., 50 grams) and formic acid (Aldrich Chemical Co., 9.99 grams))

Cyan Ink deionized water, 417.63 grams ethylene diamine tetraacetic acid (Dow Chemical Co.), 1.0015 gram;

polyethylene oxide (bisphenol-A derivative), of the formula

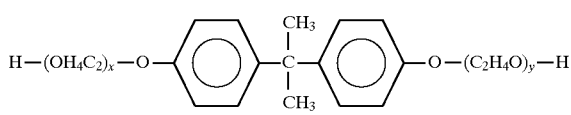

molecular weight 18,500 (Polysciences Corp.), 0.5011 gram;

DOWICIL 150 biocide (Dow Chemical Co.), 1.0016 gram;

dipropylene glycol (Ashland Chemicals), 80 grams;

tripropylene glycol methyl ether (Dow Chemical Co.), 89.99 grams;

PROJET CYAN 1 cyan dye solution (Zeneca Colors), 350.07 grams;

imidazolium formate, 60.02 grams (imidazole (Aldrich Chemical Co., 50 grams) and formic acid (Aldrich Chemical Co., 10.02 grams))

Black Ink deionized water, 574.82 grams ethylene diamine tetraacetic acid (Dow Chemical Co.), 1 gram;

polyethylene oxide (bisphenol-A derivative), of the formula

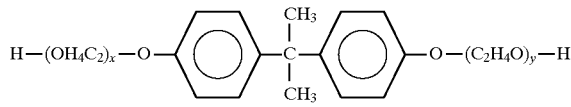

molecular weight 18,500 (Polysciences Corp.), 0.5 gram;

DOWICIL 150 biocide (Dow Chemical Co.), 1 gram;

sodium n-lauroyl sarcosinate (Sigma Chemicals), 1 gram;

BASACID BLACK X34 black dye solution (BASF), 140 grams;

BAYSCRIPT BLACK CA 51071 black dye solution (Bayer Mobay), 41.8 grams;

imidazolium formate, 239.88 grams (imidazole (Aldrich Chemical Co., 200 grams) and formic acid (Aldrich Chemical Co., 39.88 grams))

The ink compositions exhibited the following values for viscosity (centipoise, measured at 25° C., Brookfield Model DV-II), surface tension (dynes per centimeter, Kruss model K10T), pH (Corning model 345), and conductivity (mmhos, YSI Model 32/3417).

| Ink | Viscosity | Surface Tension | pH | Conductivity |
|---|---|---|---|---|
| Yellow | 2.37 | 43.9 | 7.59 (21.0° C.) | 10.60 |
| Magenta | 2.35 | 42.8 | 7.63 (22.0° C.) | 10.60 |
| Cyan | 2.41 | 41.7 | 7.47 (23.0° C.) | 9.75 |
| Black | 1.77 | 54.0 | 7.65 | 46.5 |

The inks were incorporated into a Hewlett-Packard 550C thermal ink jet printer and prints were generated onto a variety of plain office papers, thermal ink jet papers, and thermal ink jet transparencies. Good quality prints were obtained and the ink exhibited good recoverability in the printer. It is believed that these inks will exhibit excellent drying characteristics when subjected to microwave drying.

EXAMPLE III

A black ink composition was prepared by admixing the following ingredients followed by roll milling for 30 minutes and filtering the resulting ink through a 0.2 micron 142 mm Gelman Nylaflow nylon filter at 20 pounds per square inch over a period of 3 minutes and 20 seconds:

deionized water, 621.38 grams polyethylene oxide (bisphenol-A derivative), of the formula

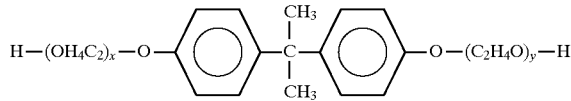

molecular weight 18,500 (Polysciences Corp.), 0.5 gram;

DOWICIL 150 biocide (Dow Chemical Co.), 1 gram;

BASACID BLACK X34 black dye solution (BASF), 107.5 grams;

ACID RED 52 dye (Tricon Colors), 17.5 grams;

imidazolium formate, 252.12 grams (imidazole (Aldrich Chemical Co., 200 grams) and formic acid (Aldrich Chemical Co., 52.12 grams))

The ink composition exhibited the following values for viscosity (centipoise, measured at 25° C., Brookfield Model DV-II), surface tension (dynes per centimeter, Kruss model K1TO), pH (Corning model 345), and conductivity (mmhos, YSI Model 32/3417).

| Viscosity | Surface Tension | pH | Conductivity |
|---|---|---|---|
| 1.77 | 54 | 7.65 (22° C.) | 46.5 |

The ink was incorporated into a Hewlett-Packard 550C thermal ink jet printer and prints were generated onto a variety of plain office papers, thermal ink jet papers, and thermal ink jet transparencies. Good quality prints were obtained and the ink exhibited good recoverability in the printer. It is believed that this ink will exhibit excellent drying characteristics when subjected to microwave drying.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition which comprises water, a colorant, and an additive selected from the group consisting of imidazolium formate, imidazolium phosphite, and mixtures thereof.

2. An ink composition according to claim 1 wherein the additive is imidazolium formate.

3. An ink composition according to claim 1 wherein the additive is imidazolium phosphite.

4. An ink composition according to claim 1 wherein the additive is present in an amount from about 1 to about 30 percent by weight of the ink.

5. An ink composition according to claim 1 wherein the additive is present in an amount from about 3 to about 25 percent by weight of the ink.

6. An ink composition according to claim 1 wherein the ink has a pH from about 5 to about 10.

7. An ink composition according to claim 1 wherein the ink has a pH from about 7 to about 8.

8. An ink composition according to claim 1 wherein the ink has a viscosity at 25° C. from about 1 to about 4 centipoise.

9. An ink composition according to claim 1 wherein the colorant is a dye.

10. An ink composition according to claim 1 wherein the ink also contains tripropylene glycol monomethyl ether.

11. An ink composition according to claim 1 wherein the ink also contains dipropylene glycol.

* * * * *